United States Patent [19]

Bürk et al.

[11] Patent Number: 4,849,896
[45] Date of Patent: Jul. 18, 1989

[54] METHOD FOR TRIGGERING A SWITCHING FUNCTION

[75] Inventors: Peter Bürk, Reuchen-Ulm; Klaus Hahn, Bühlertal, both of Fed. Rep. of Germany

[73] Assignee: Robert Bosch GmbH, Stuttgart, Fed. Rep. of Germany

[21] Appl. No.: 38,147

[22] Filed: Apr. 14, 1987

[30] Foreign Application Priority Data

Apr. 17, 1986 [DE] Fed. Rep. of Germany ....... 3612905

[51] Int. Cl.⁴ ..................... G05B 13/02; F02D 41/02; F02D 11/02
[52] U.S. Cl. .............................. 364/431.07; 123/337; 364/424.1
[58] Field of Search ................ 364/431.07, 153, 424.1; 340/146.2; 123/440, 481, 337; 307/360

[56] References Cited

U.S. PATENT DOCUMENTS

| | | | |
|---|---|---|---|
| 3,845,465 | 10/1974 | Hosick et al. | 340/146.2 |
| 3,999,084 | 12/1976 | Beaudette | 307/360 |
| 4,161,700 | 7/1979 | Fujikata et al. | 307/360 |
| 4,226,221 | 10/1980 | Asano | 123/440 |
| 4,274,382 | 6/1981 | Sugasawa et al. | 123/481 |
| 4,297,599 | 10/1981 | Werner et al. | 307/360 |
| 4,472,680 | 9/1984 | Wellington | 307/360 |
| 4,571,508 | 2/1986 | Koga et al. | 307/360 |
| 4,586,403 | 5/1986 | Lee et al. | 364/424.1 |
| 4,706,062 | 11/1987 | Männle et al. | 338/172 |

Primary Examiner—Felix D. Gruber
Attorney, Agent, or Firm—Walter Ottesen

[57] ABSTRACT

The invention is directed to a method for triggering switching functions in which the latter are triggered when the position signal emitted by a position transmitter exceeds or falls below a predeterminable signal level, the position signal being corrected and scaled in a signal-processing arrangement. A precise, long-term stable correspondence of the predeterminable signal level to a definite position of the position transmitter is assured in that the end values of the position signal corresponding to the two end stops are ascertained in a learning algorithm after each time the position transmitter is put into operation. The method is particularly suitable for triggering switching functions in a motor vehicle which has a position transmitter as a desired-value transmitter of an engine performance control or regulating system, the position transmitter being mechanically connected to the accelerator pedal of the vehicle. The triggering of the kick-down function, for example, for controlling the transmission of the vehicle occurs after a position of the accelerator pedal has been passed, the position always being located the same spacing ahead of the full-load stop. Mechanical tolerances and aging processes have no influence on this correspondence.

9 Claims, 1 Drawing Sheet

METHOD FOR TRIGGERING A SWITCHING FUNCTION

FIELD OF THE INVENTION

The invention relates to a method for triggering a switching function in dependence upon a position signal emitted by a position transmitter which has at least one mechanical end stop.

BACKGROUND OF THE INVENTION

Published German patent application DE-OS No. 34 16 495 discloses a position transmitter embodied as a potentiometer in which switching functions are triggered in correspondence with the potentiometer position. For the purpose of very precise correspondence of the switching functions with the potentiometer position, electrical switches having spatially defined ON and OFF switching points are arranged on the one potentiometer board carrying the collector path. The ON and OFF switching points are defined with respect to this collector path. Each switch includes a contact path and a contact finger rotating over and sliding on the corresponding contact path, the contact finger being mechanically connected to the potentiometer member. The beginning and end of the contact paths determine the ON and OFF point of each switch. In mass-produced products, the high production cost of the necessary mechanical precision parts such as contact paths, contact fingers and the like is disadvantageous.

A reproducible correspondence of the triggering of the switching function with a particular potentiometer circuit can be insured only by means of a low manufacturing tolerance of the potentiometer used as the position transmitter. A disadvantage is the unavoidable long-term drift of this correspondence caused by environmental factors and by aging of the position transmitter.

SUMMARY OF THE INVENTION

The method according to the invention affords the advantage of providing a reduction in cost-intensive manufacture of mechanical precision parts. This is accomplished by triggering switching functions whenever the position signal, which is originally emitted by the position transmitter and processed and standardized in a signal-processing arrangement exceeds or falls below a predetermined signal level. A further saving is attained by eliminating the previously required expenditure for cabling which was required for pickup of the switching function at the position transmitter.

To assure a predetermined correspondence of a position of the position transmitter and of the position signal with respect to the switching functions, it is advantageous that a tolerance compensation is performed automatically using a learning algorithm each time the position transmitter is again put into operation. This is done so that a predetermined position of the position transmitter is always assigned the same value at the output of the signal-processing arrangement once the learning process has been completed. First, two starting values are read into a read-write memory of the signal processing arrangement; these serve initially as the end values of the position signal associated with the two end stops of the position transmitter. If after commencing operation, the detected position signals exceed or fall below these starting values, then the old end values are rewritten with respective new end values and are taken as the new end values of the position signal corresponding to the two end stops.

In a preferred application, the position signal of a position transmitter is emitted to an engine performance control or regulating system. The position transmitter serves as a desired-value transmitter and is coupled mechanically to an accelerator pedal of a motor vehicle powered by an internal combustion engine. In many cases in the motor vehicle it is necessary or desirable, in accordance with the position of the accelerator pedal, to trigger predetermined functions such as: the kickdown function for automatic transmission control; a limitation of the rotational speed of the engine; a triggering of the anti-outswing or anti-inswing protective means in buses; or, switching a starting aid on and off for reinforcing the starting the motor vehicle.

In one embodiment of the invention, mechanical adjusting means such as trimming potentiometers are provided for adjusting the one or more predeterminable signal levels. In another embodiment, the predeterminable signal levels are contained in a read-only memory or in the read-write memory in the evaluation unit.

It is also advantageous to provide some means of intervention for blocking the switching function.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
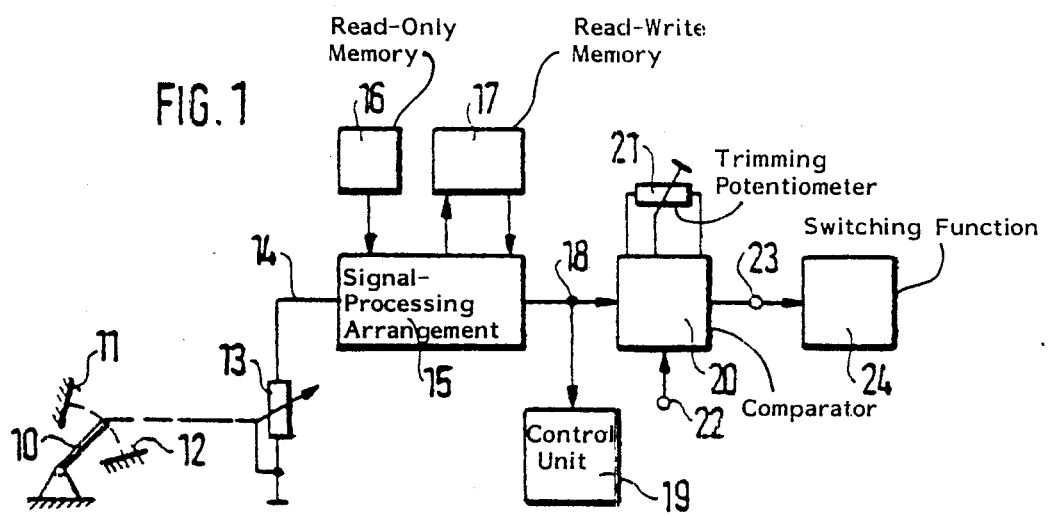
FIG. 1 is a block diagram of a circuit arrangement for performing the method according to the invention; and, FIG. 2 illustrates a functional relationship between an output signal of the circuit arrangement and a position signal.

FIG. 1 shows an accelerator pedal 10 of a motor vehicle which is movable between first and second end stops (11, 12). A potentiometer 13 is mechanically coupled to the accelerator pedal 10. The position signal 14 that can be picked up from the potentiometer 13 reaches a signal-processing arrangement 15 which has a read-only memory (ROM) 16 and a read-write memory (RWM) 17. The output signal 18 of the signal-processing arrangement 15 reaches both a control unit 19 and a comparator 20. A trimming potentiometer 21 and a control line 22 are connected to the comparator 20. At the output 23 of the comparator 20, a signal for triggering switching functions 24 is available.

Figure 2:
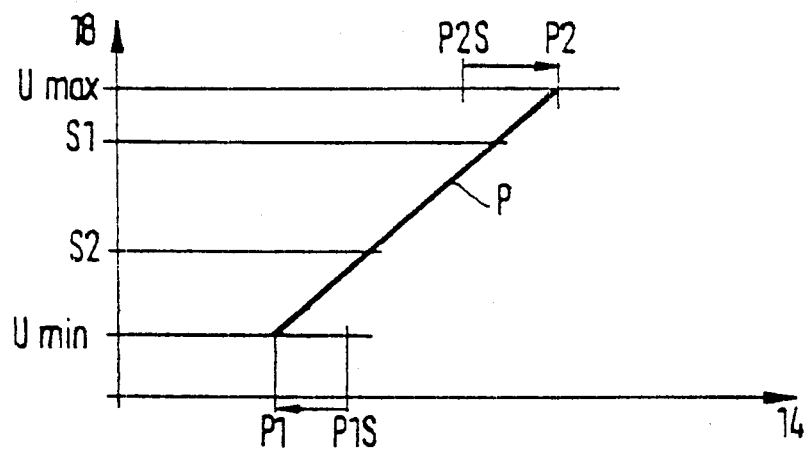

FIG. 2 shows a functional relationship between the position signal 14 and the output signal 18. The output signal 18 is limited to a minimum value (Umin) and a maximum value (Umax). The position signal 14 is characterized by the following characteristic values: P1 is a first end value corresponding to the first end stop 11 and P2 is a second end value corresponding to the second end stop 12 of the position signal 14. P1S is a predetermined first starting value which is stored in the read-only memory 16 and P2S is a predetermined second starting value also stored in the read-only memory 16 for the first and second end values (P1, P2), respectively. The letter P designates a detected value of the position signal 14. S1 and S2 are two signal levels of the output signal 18.

First, the tolerance compensation of the position signal 14 which takes place in the signal-processing arrangement 15 will be explained in further detail. After the position transmitter (10, 13) is put into operation, the first and second starting values (P1S, P2S) are called up from the read-only memory 16 and stored in the read-write memory 17 as starting values for the first and second end values (P1, P2), respectively. Then, an actual value P of the position signal 14 is detected. The actual value P is then compared with the end values (P1, P2) located in the read-write memory 17. If the measured value P drops below the first end value P1, the stored end value P1 is overwritten with the measured value. If the measured value P exceeds the stored second end value P2, then the stored value P2 is overwritten with the measured value. As these operations are run through in cycles, the first end value P1 corresponding to the first end stop 11 and the second end value P2 corresponding to the second end stop 12 are learned.

Each measured value P of the position signal 14 is related to the two end values P1, P2 and calibrated to a minimum and maximum value (Umin, Umax) and emitted as an output signal 18 by the signal-processing arrangement 15. The corrected and calibrated output signal 18 is obtained from a linear interpolation between the two pairs of values P2, Umax and P1, Umin. A simplification is provided by setting the minimum value Umin to zero.

As a consequence of the tolerance compensation method described, the same signal value of the output signal 18 always corresponds to a predetermined position of the accelerator pedal 10. If the first and second end values (P1, P2) of the corresponding first and second end stops (11, 12) change during operation because of temperature factors or mechanical maladjustment, for example, then a correction of the first or second end values (P1, P2) is effected in cyclically running operations, so that the minimum or maximum signal level (Umin or Umax) of the output signal 18 always corresponds to the two end stops 11, 12.

The output signal 18 reaches the control unit 19 on the one hand, in which a control or regulating operation is initiated in dependence upon the position of the position transmitter 13 and, on the other hand, the output signal 18 reaches the comparator 20. The comparator 20 compares the output signal 18 with one or more predeterminable signal levels (S1, S2). If the output signal 18 exceeds or falls below the signal levels (S1, S2), then a signal for triggering switching functions 24 is emitted at the output 23 of the comparator 20.

In the fuel-powered motor vehicle, there are numerous functions 24 that can be triggered in dependence upon the position of the accelerator pedal 10. One important function is the kick-down function for controlling the transmission of a motor vehicle equipped with an automatic transmission. This function should be triggered whenever the accelerator pedal 10 is in a predetermined position at a well-defined spacing ahead of the full-load end stop corresponding to the second end stop 12. If this condition arises, then the automatic transmission is shifted to a lower gear in order to obtain a more favorable acceleration according to the driver's requirement. The signal level S1, above which the kick-down function is triggered, is for example located at 80% of the full-load value, Umax. The 80% value is always maintained irrespective of aging and drifting phenomena.

Other applications are a limitation of the rotational speed of the internal combustion engine in the motor vehicle, the triggering of the anti-inswing and anti-outswing protective means in buses and switching ON and OFF a starting aid for reinforcing the starting process of the motor vehicle. The starting aid is switched ON below the second predeterminable switching level S2 and is switched OFF thereabove. The signal level S2 is for example at 20% above the signal value Umin of the output signal 18 corresponding to the idling stop 11.

For adjusting the signal level (S1, S2) at least one of which is predeterminable, a trimming potentiometer 21 may be provided. However, it is also possible to store the signal levels (S1, S2) in the read-only memory 16 of the signal processing arrangement 15. As the memory element, an electrically erasable and programmable memory (EEPROM), which continues to retain its information after the operating voltage has been shut off, is suitable.

The triggering of the switching function 24 in dependence upon exceeding or falling below at least one of the signal levels (S1, S2) can be blocked by means of a control line 22. The triggering of the switching function 24 thus becomes dependent on other parameters. Such parameters may for example be the engine temperature, rotational speed and the like.

It is understood that the foregoing description is that of the preferred embodiments of the invention and that various changes and modifications may be made thereto without departing from the spirit and scope of the invention as defined in the appended claims.

What is claimed is:

1. A method for triggering at least one switching function in a vehicle driven by an internal combustion engine having an element which determines the power of the engine and has at least one mechanical end stop, the triggering of the switching function being in dependence upon a signal of a position transducer of said element and with said transducer providing an end stop position signal corresponding to said end stop, the method comprising the steps of:

storing start values (P1S, P2S) of the position signal in a read-only memory for correcting and scaling said end stop position signal;

said start values (P1S, P2S) corresponding to position signal values in the vicinity of said one end stop which are passed through when said end stop is approached;

transferring said start values from said read-only memory into a read-write memory (17) of a signal processing arrangement (15) as the end values (P1, P2) representing end stop;

comparing the actual positioning signal (P) with stored end values in the signal-processing arrangement 15;

overwriting one of the stored end values with the actual value of the position signal when the latter exceeds one of the end values;

scaling the actual value of the position signal to a value which is determined from the stored end values (P - P1)/(P1 - P2);

calibrating this scaled value to a signal value U of the output signal 18 of the signal processing arrangement 15 given by:

$$U = \frac{U\text{max} - U\text{min}}{P2 - P1}(P - P1) + U\text{min}$$

wherein said signal value U lies between a maximum value (Umax) and a minimum value (Umin);

comparing the output signal 18 of the signal processing arrangement 15 in a comparator 20 to signal values (S1, S2) which can be stored or pregiven by potentiometers;

initiating a switching function 24 in dependence upon a signal at the output 23 of said comparator 20; and, said comparator 20 generating an output signal when the scaled and calibrated actual position signal exceeds or drops below one of the predetermined signal values.

2. The method of claim 1, wherein the position signal (14) is emitted to an engine performance control and regulating system from a position transmitter serving as a desired-value transmitter, said position transmitter being mechanically coupled with an accelerator pedal of a motor vehicle.

3. The method of claim 1, wherein the switching function (24) is utilized as a kick-down function for controlling the transmission of a motor vehicle.

4. The method of claim 1, wherein the switching function (24) is utilized for limiting the rotational speed of the engine of a motor vehicle.

5. The method of claim 1, wherein the switching function (24) is utilized for triggering the in-swing and out-swing protection means of a bus.

6. The method of claim 1, wherein the switching function (24) is provided for controlling a starting aid for reinforcing the starting operation of a motor vehicle.

7. The method of claim 1, wherein mechanical adjusting means are provided for adjusting said at least one signal level (S1, S2).

8. The method of claim 1, wherein said at least one pregiven signal level (S1, S2) is stored in the read-only memory or the read-write memory of the signal-processing arrangement.

9. The method of claim 1, wherein the triggering of the switching function is dependent upon a control signal on a control line.

* * * * *

UNITED STATES PATENT AND TRADEMARK OFFICE
CERTIFICATE OF CORRECTION

PATENT NO. : 4,849,896
DATED : July 18, 1989
INVENTOR(S) : Peter Bürk and Klaus Hahn It is certified that error appears in the above-identified patent and that said Letters Patent is hereby corrected as shown below:

In column 4, line 50: insert -- said -- between "representing" and "end".

In column 4, the formula at line 65 should read:

$$U = \frac{U_{max} - U_{min}}{P2 - P1} (P - P1) + U_{min}$$

Signed and Sealed this

Fifteenth Day of May, 1990

Attest:

HARRY F. MANBECK, JR.

*Attesting Officer*  *Commissioner of Patents and Trademarks*